United States Patent [19]

Selecman

[11] Patent Number: 4,600,168
[45] Date of Patent: Jul. 15, 1986

[54] GROUND HANDLING APPARATUS FOR A HELICOPTER

[75] Inventor: Charles E. Selecman, Fort Worth, Tex.

[73] Assignee: Spinks Industries, Inc., Fort Worth, Tex.

[21] Appl. No.: 568,885

[22] Filed: Jan. 6, 1984

[51] Int. Cl.⁴ .............................................. B64C 25/34
[52] U.S. Cl. ................................... 244/50; 244/17.17
[58] Field of Search ...................... 244/17.17, 50, 1 R, 244/137 R, 100 R; 280/43.23, 43.24, 11, 47.13 R, 7.12, 8, 9, 10

[56] References Cited

U.S. PATENT DOCUMENTS 2,989,273  6/1961  Grunfelder ..................... 244/137 R
3,279,722 10/1966  Glover, Jr. et al. ............. 244/17.17

Primary Examiner—Trygve M. Blix
Assistant Examiner—Rodney Corl
Attorney, Agent, or Firm—Arthur F. Zobal

[57] ABSTRACT

An apparatus with wheels which may be removably attached to either of the skid type landing rails of a helicopter. A generally U-shaped attaching member is adapted to be removably attached to either of the rails. A support member has its bottom end pivotally coupled to the top of said attaching member. Structure connected to said support member has an engaging end adapted to engage the top portion of said rail when said attaching member is attached to said rail. The central portion of a generally U-shaped axle member is pivotally coupled to the upper end of the support member. The axle member has two outwardly extending arms with wheels attached thereto such that the wheels will be located on opposite sides of the rail. One end of a cylinder is pivotally coupled to said structure. Said cylinder has a piston which is pivotally coupled to the central portion of said axle member offset from the axis of said central portion. When the piston is retracted, the wheels are at a position such that the rail engages and is supported by the ground. When the piston is extended, the wheels are moved to a position to lift and support the rail above the ground.

8 Claims, 7 Drawing Figures

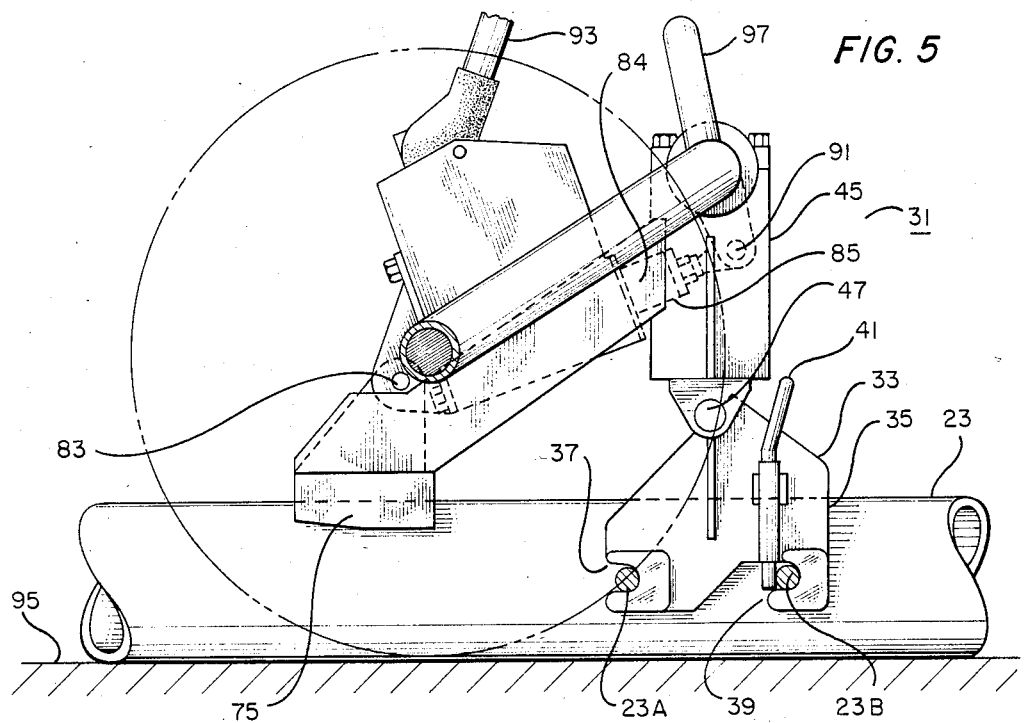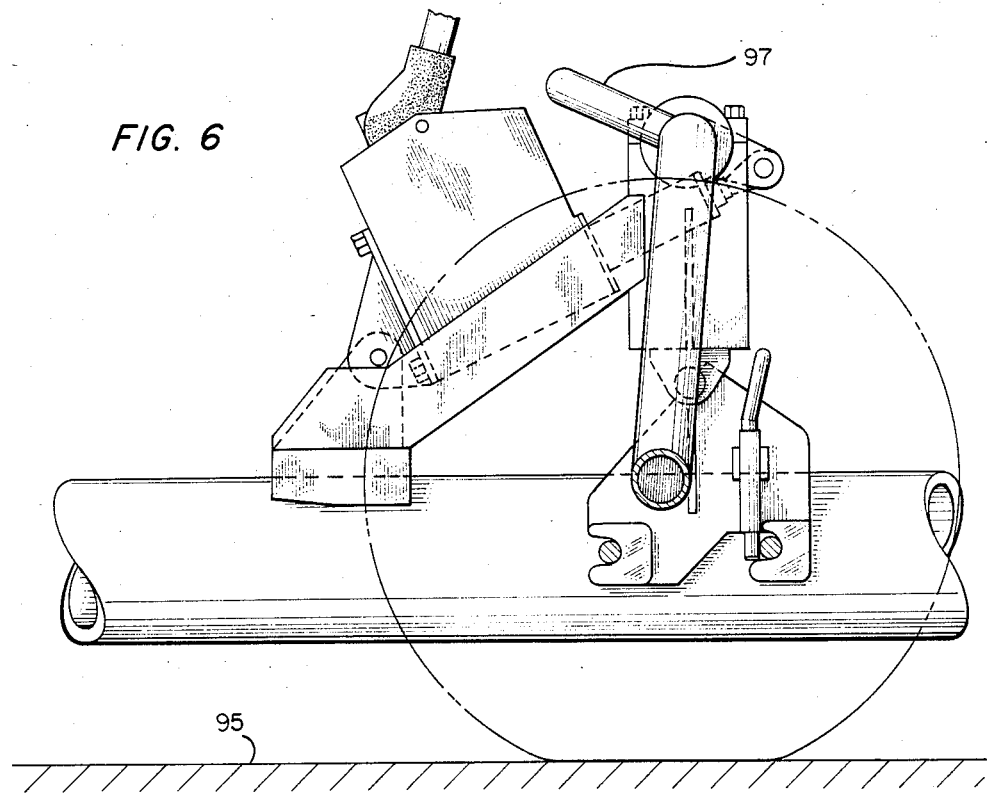

4,600,168

GROUND HANDLING APPARATUS FOR A HELICOPTER

BACKGROUND OF THE INVENTION

Many helicopters have two skid type landing rails which support the helicopter on the ground. In order to move the helicopter about on the ground, removable ground handling units having wheels must be attached to the rails. The known ground handling units used in the past are constructed such that most units attach either to a "left" or "right" skids and are constructed to attach to only one model helicopter. Thus two different units are required for most helicopters and attach to the specific model of helicopter only. This has disadvantages in that it increases the cost and variety of the units required.

SUMMARY OF THE INVENTION

It is an object of the present invention to provide a universal ground handling apparatus which may be removably attached to either the left or right landing rails of a helicopter. The apparatus of the present invention may be used on all models of skid landing gear helicopters.

The apparatus comprises a generally U-shaped attaching means adapted to fit partially around either of the rails from its top. The rails are modified to have rod means extending from opposite sides thereof. The arms of said generally U-shaped attaching means have slots formed therein for receiving the ends of said rod means for removably attaching said generally U-shaped attaching means to said rail such that when said generally U-shaped attaching means is lifted, it lifts said rail. Support means is pivotally coupled to the upper portion of said generally U-shaped attaching means.

Structure connected to said support means has an engaging means located at a position spaced from said support means and from said generally U-shaped attaching means. Said engaging means is adapted to engage the top portion of said rail when said generally U-shaped attaching means is attached to said rail. A generally U-shaped axle means has its central portion pivotally coupled to the upper portion of said support means. Said generally U-shaped axle means has two outwardly extending arms with wheels attached to the lower ends thereof such that said wheels may be located on opposite sides of said rail when said generally U-shaped attaching means is attached to said rail. A cylinder has one end pivotally coupled to said structure. Said cylinder has a piston that may be moved inward and outward of the other end thereof. Said piston is pivotally coupled to said central portion of said generally U-shaped axle means offset from the axis of said central portion. Said arms of said generally U-shaped axle means are adapted to be pivoted by said piston between a first position where said lower ends are near said engaging means and away from said generally U-shaped attaching means and a second position where said lower ends are near said generally U-shaped attaching means and said arms of said generally U-shaped axle means are nearly vertical when said generally U-shaped attaching means is attached to said rail. In said first position, said piston is in a retracted position and in said second position said piston is in an extended position. In said first position, said wheels are in a position to allow said rail to engage the ground. When said cylinder is actuated to move its piston to an extended position, wherein said arms are in said second position, said wheels are moved to a position such that they lift and support said generally U-shaped attaching means and hence said rail above the ground.

BRIEF DESCRIPTION OF THE DRAWINGS

FIG. 5 is a side view of the ground handling unit of FIGS. 3 and 4 attached to a rail of a helicopter with its wheels in a position to allow the rail to be supported by the ground.

FIG. 6 is a side view of the ground handling unit of FIG. 5 attached to the rail of the helicopter with its wheels in a position to support the rail above the ground.

DESCRIPTION OF THE PREFERRED EMBODIMENT

Figure 1:
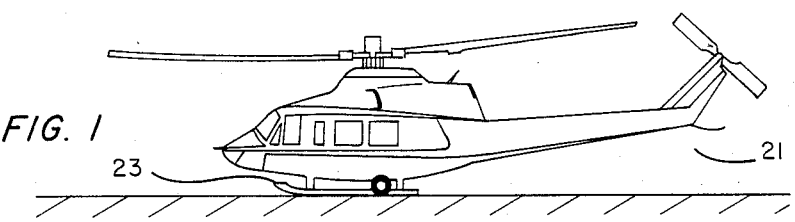
FIG. 1 is a side view of a helicopter with the ground handling units of the invention attached to its rails in a position such that their wheels allow the rails of the helicopter to be supported by the ground.
Figure 1A:
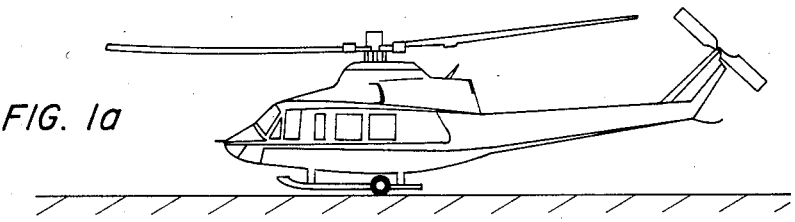
FIG. 1a is a side view of a helicopter with the ground handling units of the invention attached to its rails and with their wheels in a position such that the wheels lift and support the rails and hence the helicopter above the ground.
Figure 2:
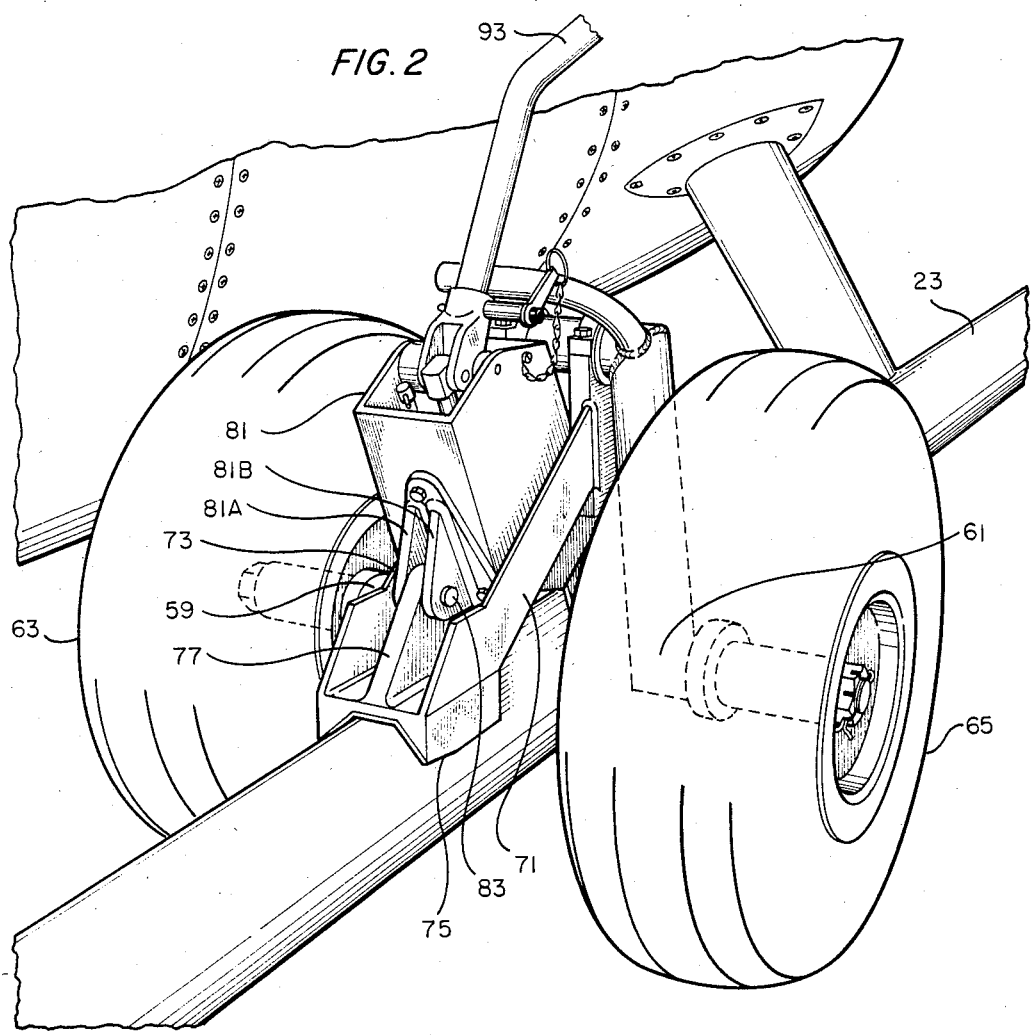
FIG. 2 is a close up view of one end of one of the ground handling units of the invention attached to one of the rails of a helicopter.
Figure 3:
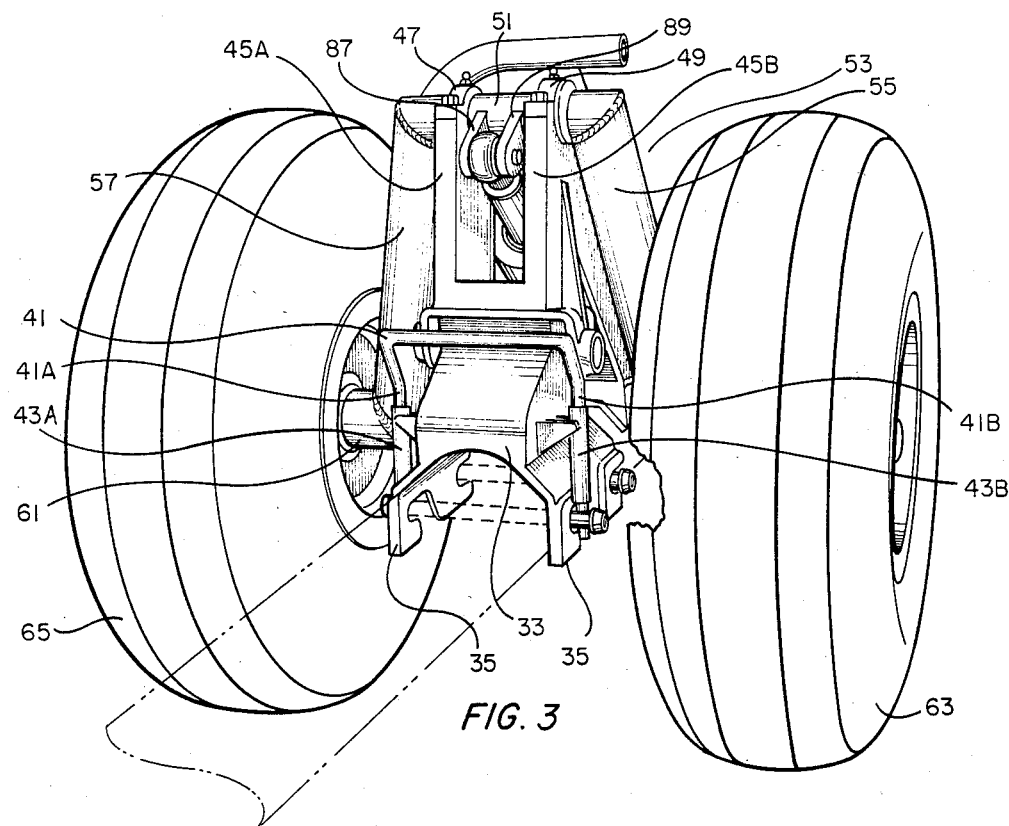
FIG. 3 is a close up view of the opposite end of the ground handling unit of FIG. 2 attached to the rail of the helicopter.
Figure 4:
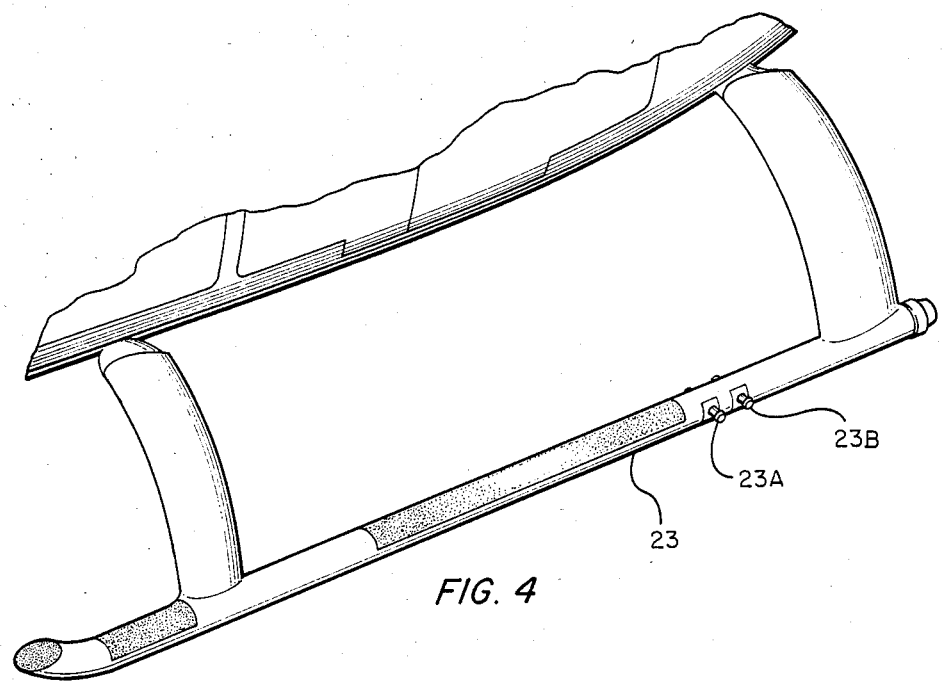
FIG. 4 illustrates one of the rails of a helicopter modified with two rods extending through the rail.

Referring now to FIGS. 1 and 1a there is illustrated a conventional helicopter 21 having skid type landing rails 23 for supporting the helicopter on the ground. Although not shown, the helicopter has two landing rails 23, one a "left" rail and the other a "right" rail. The ground handling apparatus or unit of the invention is identified at 31. One of the units 31 will be attached to each of the rails 23 for allowing the helicopter to be moved around while on the ground. The unit 31 can be attached to either the "left" rail or the "right" rail. In FIGS. 2-6, only one of the units 31 will be described for attachment to one of the rails 23. As shown in FIG. 4, each of the rails 23 will be modified to have two metal rods 23A and 23B extending therethrough generally horizonally with their ends projecting outward beyond opposite sides of the rail 23. The rods 23A and 23B will be fixedly attached to the rail 23.

The ground handling unit comprises a generally U-shaped attaching member 33 adapted to fit partially around the rail 23 from its top. The two arms 35 of the member 33 each have two slots 37 and 39 adapted to receive the ends of the rods 23A and 23B on both sides of the rail 23 to removably attach the member 33 to the rail 23. A U-shaped bolt member 41 has its two arms 41A and 41B slidedly located in tubes 43A and 43B attached to the member 33 such that the bolt 41 may be moved downward to allow its arms 41A and 41B to close the open ends of the slots 39 to securely hold the ends of the rod 23B in the slots 39 thereby securely attaching the member 33 to the rail 23. In attaching the member 33 to the ends of the rods 23A and 23B, the member 41 is moved upward such that its arms 41A and 41B are upward away from the slots 39. The member 33 then is moved to the left as seen in FIG. 5 to locate the ends of the rods 23A and 23B in the slots 37 and 39. Member 41 then is lowered to the position shown in FIG. 5. In detaching the member 33 from the rail 23, the rod 41 is moved upward to move its arms 41A and 41B upward away from the slots 39 whereby the member 33 may be moved to the right as seen in FIG. 5 to move the member 33 away from the ends of the rods 23A and 23B of the rail 23.

A support member 45 has its lower end pivotally coupled to the upper end of the member 33 by pin 47. The support member 45 is U-shaped and has two upwardly extending arms 45A and 45B. The arms 45A and 45B have semicircular openings formed in their top ends thereof. Semicircular ring members 47 and 49 are attached to the upper ends of the arms 45A and 45B respectively. The central portion 51 of an axle member 53 with suitable bearings is located in the openings formed between members 47 and 49 and the upper ends of arms 45A and 45B respectively such that the central portion 51 of the axle member 53 is pivotally coupled to the upper ends of arms 45A and 45B. The axle member 53 is generally U-shaped and has two arms 55 and 57 connected to the opposite ends of the central portion 51 which extend downward on opposite sides of the support member 45. The lower ends of the arms 55 and 57 have outward extending stud members 59 and 61 extending therefrom which support two wheels 63 and 65 on opposite sides of the arms 55 and 57 and hence on opposite sides of the rail 23 when the unit 31 is attached to the rail.

Two arms 71 and 73 are fixedly attached to the arms 45A and 45B of the member 45 and extend downwardly terminating in an inverted trough shaped member 75, the bottom of which is adapted to engage the top of the rail 23 at a position spaced from the U-shaped member 33. A tongue 77 extends upwardly from the top of the trough shaped member 75 between the arms 71 and 73. A cylinder assembly 81 has two tabs 81A and 81B attached thereto at its lower ends which are pivotally coupled to the tongue 77 by way of a pin 83. Thus the lower end of the cylinder assembly 81 is pivotally coupled to member 75. The cylinder assembly 81 supports a cylinder 84 with a piston 85. The outer end of the piston 85 is pivotally coupled to the central portion 51 of the axle member 55 offset from the axis of the central portion 51. In this respect, two tabs 87 and 89 are fixedly attached to the central portion 51 and extend outward away from the axis thereof. The outer end of the piston 85 is located between the tabs 87 and 89 and is pivotally coupled thereto by way of a pin 91. The cylinder 83 is a manually actuated hydraulic cylinder having a handle 93 which may be actuated to move its pistons outward to an extended position. A release mechanism (not shown) may be actuated to allow the piston 85 to be moved to its retracted position.

The arms 55 and 57 of the axle member may be pivoted between a first position as shown in FIG. 5 where their lower ends are near the trough member 75 and a second position as shown in FIG. 6 where their lower ends are near said attaching member 33. At the second position the arms 55 and 57 are nearly vertical when the unit 31 is attached to the rail 23 as shown in FIG. 6. The axle arms 55 and 57 may be moved to their first and second positions by actuating the cylinder 83 to either retract its piston 85 or to extend its piston 85.

Assume that the rails 23 of a helicopter are resting on the ground 95 and it is desired to attach a unit 31 to each of the rails and to position the wheels of the units 31 in operative positions such that the helicopter can be moved on the ground while supported by the wheels. A unit 31 is attached to each of the rails of the helicopter and operated in the following manner to place its wheels in an operative position. The U-shaped bolt 41 is raised and the arms 35 of the U-shaped member 33 are fitted over the rail 23 from its top such that the slots 37 and 39 are located to the right of the ends of the bolts 23A and 23B as seen in FIG. 5. The unit 31 then is moved to the left as shown in FIG. 5 such that the ends of the bolts 23A and 23B are located in the slots 37 and 39. The U-shaped bolt 41 then is lowered to lock the ground handling unit 31 to the rail 23. In this position, the bottom end of the trough shaped member 75 engages the top of the rail 23 at a position spaced from the attaching member 33. Initially the cylinder 83 will be in a condition such that its piston 85 is in its retracted position. In this position, the axle arms 55 and 57 will be located in the position shown in FIG. 5 such that the wheels 63 and 65 are at a level such that their lower ends are at or above the ground 95. The handle 93 then will be operated to actuate the cylinder 83 to move its piston 85 in an extended position. As this occurs, the axle arm members 55 and 57 are moved to nearly vertical positions (to the right from the position shown in FIG. 5 to the position shown in FIG. 6) such that the wheels 63 and 65 are moved to the position shown in FIG. 6 lifting the member 33 and hence the rail 23 such that the wheels support the rail 23 above the ground. The rods 23A and 23B are attached to the rails 23 at positions such that the weight of the helicopter is balanced on opposite sides of the rods 23A and 23B. Thus when the units 31 are attached to the rails and the wheels moved to positions to raise the rails above the ground, the helicopter can be easily moved on the ground on the wheels 63 and 65 of the ground handling units 31. The pistons 85 of the units 31 have lengths such that when they are moved to their extended positions, the axle arms 55 and 57 never are moved over center and are located at positions such that they are nearly but not vertical as shown in FIG. 6 whereby when the pistons are allowed to move to their retracted positions, the wheels will return to the position shown in FIG. 5.

In order to lower the helicopter and to remove each unit 31 from the rails 23, the cylinder 83 of each unit is released such that its piston 85 moves to its retracted position lowering the rail 23 until it rests on the ground as shown in FIG. 5. The unit 31 can be removed from the rail by lifting the bolt 41 and sliding the unit to the right as seen in FIG. 5 to remove the rods 23A and 23B from the slots 37 and 39.

Member 97 is a handle for carrying the unit 31.

I claim:

1. An apparatus for attachment to a skid type landing rail of a helicopter for use for moving the helicopter while on the ground, said rail having rod means extending from opposite sides thereof, comprising:

a generally U-shaped attaching means adapted to fit partially around said rail from its top, the arms of said generally U-shaped attaching means having slot means formed therein for receiving the ends of said rod means for removably attaching said generally U-shaped attaching means to said rail such that when said generally U-shaped attaching means is lifted, it lifts said rail, support means pivotally coupled to the upper portion of said generally U-shaped attaching means, structure connected to said support means and having an engaging means located at a position spaced from said support means and from said generally U-shaped attaching means, said engaging means being adapted to engage the top portion of said rail when said generally U-shaped attaching means is attached to said rail, a generally U-shaped axle means having its central portion pivotally coupled to the upper portion of said support means, said generally U-shaped axle means having two outwardly extending arms with wheels attached to the lower ends thereof such that said wheels may be located on opposite sides of said rail when said generally U-shaped attaching means is attached to said rail, a cylinder having one end pivotally coupled to said structure, said cylinder having a piston that may be moved inward and outward of the other end thereof, said piston being pivotally coupled to said central portion of said generally U-shaped axle means offset from the axis of said central portion, said arms of said generally U-shaped axle means being adapted to be pivoted by said piston between a first position where said lower ends are near said engaging means and away from said generally U-shaped attaching means and a second position where said lower ends are near said generally U-shaped attaching means and said arms of said generally U-shaped axle means are nearly vertical when said generally U-shaped attaching means is attached to said rail, in said first position, said piston being in a retracted position and in said second position, said piston being in an extended position, in said first position, said wheels being in a position to allow said rail to engage the ground, when said cylinder is actuated to move its piston to an extended position, wherein said arms are in said second position, said wheels being moved to a position such that they lift and support said generally U-shaped attaching means and hence said rail above the ground.

2. The apparatus of claim 1 wherein:
said engaging means is adapted to merely engage the top portion of said rail and is not attached thereto when said attaching means is attached to said rail.

3. The apparatus of claim 1, wherein:
said support means is pivotally coupled to the upper portion of said attaching means for pivotal movement about a first axis,
said generally U-shaped axle means has its central portion pivotally coupled to the upper portion of said support means for pivotal movement about a second axis,
said first and second axes being generally parallel to each other and transverse to the length of said rail when said attaching means is attached thereo.

4. The apparatus of claim 3, wherein:
said engaging means is adapted to merely engage the top portion of said rail and is not attached thereto when said attaching means is attached to said rail.

5. An apparatus for attachment to a skid type landing rail of a helicopter for use for moving the helicopter while on the ground, comprising:
an attaching means adapted to be attached to said rail such that when said attaching means is lifted, it lifts said rail,
support means pivotally coupled to said attaching means,
structure connected to said support means and having an engaging means located at a position spaced from said support means and from said attaching means,
said engaging means being adapted to engage the top portion of said rail when said attaching means is attached to said rail,
frame means having a central portion and two spaced apart arms extending from said central portion,
said frame means having its central portion pivotally coupled to said support means,
wheels attached to the lower ends of said arms such that said wheels may be located on opposite sides of said rail when said attaching means is attached to said rail,
lever means attached to said central portion of said frame means,
cylinder and piston means coupled between said structure and said lever means,
said arms of said frame means being adapted to be moved by said cylinder and piston means between a first position where said wheels allow said rail to engage the ground and a second position where said wheels lift and support said attaching means and hence said rail above the ground, wherein said pivotal coupling of said support means to said attaching means permits relative movement between said support means and said rail when said attaching means is attached to said rail and when said arms and said frame means are moved to said second position.

6. The apparatus of claim 5, wherein:
said engaging means is adapted to merely engage the top portion of said rail and is not attached thereto when said attaching means is attached to said rail.

7. The apparatus of claim 5, wherein:
said support means is pivotally coupled to said attaching means for pivotal movement about a first axis,
said frame means has its central portion pivotally coupled to said support means for pivotal movement about a second axis,
said first and second axes being generally parallel to each other and transverse to the length of said rail when said attaching means is attached thereto.

8. The apparatus of claim 7, wherein:
said engaging means is adapted to merely engage the top portion of said rail and is not attached thereto when said attaching means is attached to said rail.

* * * * *